United States Patent [19]

Hoberman

[11] Patent Number: 4,544,910

[45] Date of Patent: Oct. 1, 1985

[54] EXIT SIGN LAMP FLASHING SYSTEM WITH SELF-CHECKING PROVISIONS

[76] Inventor: Max Hoberman, R. Diskin 5 K. Wofson, Jerusalem, Israel

[21] Appl. No.: 376,759

[22] Filed: May 10, 1982

[51] Int. Cl.[4] ........................ G08B 1/00; G08B 21/00; H02J 7/04

[52] U.S. Cl. ........................ 340/333; 320/48; 340/516; 340/636; 307/66

[58] Field of Search ............... 340/516, 333, 636, 515; 307/66; 320/48

[56] References Cited

U.S. PATENT DOCUMENTS

| | | | |
|---|---|---|---|
| 3,384,886 | 5/1968 | Serra | 340/333 |
| 4,088,986 | 5/1978 | Boucher | 340/333 |
| 4,199,754 | 4/1980 | Johnson | 340/333 |
| 4,388,615 | 6/1983 | Ford | 340/516 |

*Primary Examiner*—James J. Groody
*Attorney, Agent, or Firm*—Ralph R. Roberts

[57] ABSTRACT

An emergency exit sign auxiliary lamp flashing system operates from self-contained rechargeable batteries upon failure of the electrical power from the AC power mains supplying power to the exit sign, including a charging circuit for recharging the batteries, with provisions for preventing overcharging and for disconnecting the load from the batteries before the battery voltage drops to a level which would impair its service life. Included is a solid state circuit which provides for automatically exercising and self-testing the proper functioning of the system to ensure its being serviceable when called upon to function during a power failure by periodically simulating the effect of a failure of AC power and verifying that the battery, lamp and flashing circuit operate normally or signalling a visual and/or audible alarm if they fail to operate properly.

5 Claims, 5 Drawing Figures

EXIT SIGN LAMP FLASHING SYSTEM WITH SELF-CHECKING PROVISIONS

SUMMARY OF THE INVENTION

The present invention relates to emergency exit signs operating from standby rechargeable batteries upon failure of electrical power from the AC power mains, and means to automatically verify periodically that the equipment will operate properly when called upon to do so in a real power failure. More specifically, it relates to emergency exit signs provided with an auxiliary lamp flashing system operated from rechargeable batteries charged from the rectified current from the AC power mains and capable of providing several hours of flashing operation of the exit sign illumination in the event of a power failure. While describing the system primarily in terms of flashing auxiliary lamp illumination, the principle is equally applicable to non-flashing illumination by simple modifications described.

Often, particularly when an emergency standby battery system has been inactive for long periods of time, a failure of some component of the emergency system will preclude its proper operation at the time when emergency use is required, thereby vitiating its whole intent and purpose. Periodic servicing, verifying proper operation by "exercising" the system and making any necessary repairs should all be properly done at the time when the emergency system is not needed, but until there is a power failure, little incentive exists to check such systems and so they are frequently left unchecked to deteriorate and be inoperative at the time needed.

It is therefore the primary object of the present invention to provide an automatic system for checking that the emergency battery powered equipment will function properly should it be called upon to do so, by periodically (say, once per day or once per week or at such interval as deemed appropriate) simulating the effect of an interruption of AC mains power and verifying that the emergency battery powered equipment indeed operates as required.

It is a further object of the present invention to provide a visual and/or audible alarm in the event that the emergency system would have failed to function properly at that time should a real power failure have occurred, by performing simulated power failure tests periodically and signalling such alarm upon malfunction.

The above and other objects of the present invention are realized in a specific illustrative embodiment thereof wherein a rechargeable battery is maintained at full or near full capacity by float charging from the rectified AC power mains current and arranged to provide power to an auxiliary lamp flashing circuit upon failure of the AC mains power with means to disconnect the battery from its load before it becomes excessively depleted and timing means to interrupt the charging current to the battery, thereby simulating a condition which occurs upon failure of the AC power. Simultaneously a visual and/or audible alarm becomes activated and is then deactivated by circuit means upon evidence that the emergency flashing lamps have operated properly through the generation of a resetting signal which removes the simulated power failure and reinitiates the timing mechanism to begin timing again toward the next periodic failure simulation and test. In the event that such resetting signal derived only from proper operation of the lamp flashing system is not obtained, signifying some malfunction of the battery, charger, lamp or flashing circuit, the visual and/or audible alarm does not become inactivated and being energized from a source separate from the rechargeable battery system, namely the AC power mains, continues to operate until AC power is disconnected or the cause of the circuit malfunction is corrected. Provision is included to shorten the periodic verification period, which may be as often as every day or extended to once per week or once per month or whatever test schedule is deemed appropriate, to once every few minutes for purposes of "fast testing" the system during servicing and bench testing without the need to wait for the daily, weekly, monthly or other normal timing cycle.

A further purpose of the invention is to "exercise" the emergency lamp flashing system in a manner similar to that which it would be called upon to do should an actual power failure occur and by so "exercising" the system, to stress its components under normal operation thereby disclosing faults which might not be uncovered with other checking systems which might only measure battery voltage or charging corrent, or lamp continuity. Consequently, failure of any part of the battery charging system, for example, will, through this periodic "exercising" of the entire flashing system, gradually result in depletion of the battery to such a point that it will not be capable of providing normal flashing and the resetting signal and only then signalling a failure when tested even though immediately upon failure of the battery charging system and for a short time afterwards while the batteries still hold a sufficient charge, the periodic test would not have indicated the circuit malfunction because enough charge would have been retained to activate the emergency lamp flashing system normally for a limited period of time after this failure in the battery charging system.

The invention further includes means to visually indicate that charge current is flowing and that timing is in progress through miniature Light Emitting Diode illumination.

The above and other objects, features and advantages of the present invention will become more apparent from the following detailed description of a specific embodiment thereof presented herein below in conjunction with the accompanying drawings which schematically depict the charger-flasher circuit incorporating automatic self-checking provisions in accordance with the principles of the present invention in which:

DESCRIPTION OF THE PREFERRED EMBODIMENT

Figure 1:
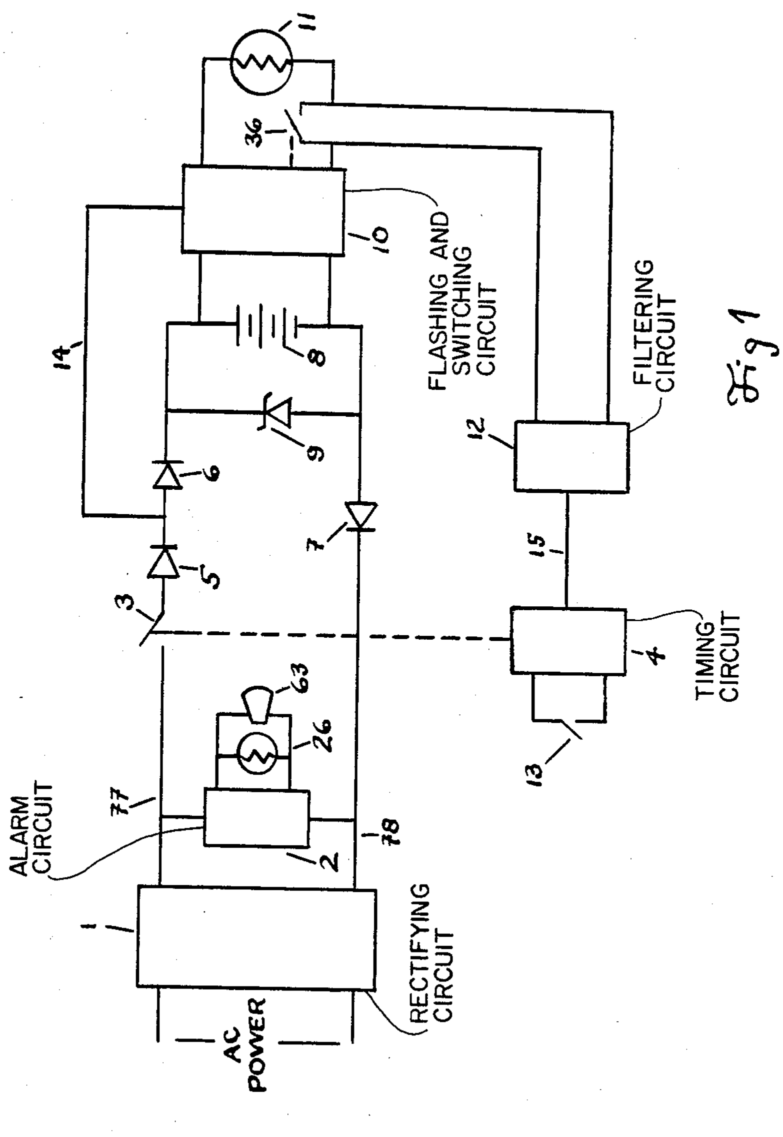
FIG. 1 is an overall block diagram of the charger-flasher system incorporating self-testing provisions.

Referring to FIG. 1 there is shown a block diagram of the charger-flasher system with self-testing capability which includes a rectifying circuit 1 operating directly from the AC power mains to provide rectified and filtered DC, 77 and 78, to a failure indicating alarm circuit 2 and through switch means 3 shown here schematically and blocking diodes 5, 6, 7 to rechargeable battery 8, there being some circuit elements common to the FIG. 1 subportions. Connected in parallel circuit arrangement with battery 8 is a Zener diode 9 which prevents application of excessive voltage to battery 8 by shunting a current which, in conjunction with the self-resistance of rectifying circuit 1, is sufficient to maintain the voltage applied to battery 8 at a value not exceeding the manufacturer's recommendations. Flashing and switching means 10 connects battery 8 with a load 11 consisting of one or more incandescent lamps or such other load which it is desirous of energizing upon failure of AC power, in series with a transistor switch 36 shown schematically in FIG. 1 for sake of simplification. Triggering means 14 is connected to actuate flashing and switching means 10 from the junction between blocking diodes 5 and 6, the voltage at said junction being close to the positive voltage of battery 8 when diodes 5 and 6 are conducting charging current to battery 8, and falling closer to the potential of the negative terminal of battery 8 when charging current ceases to flow, said change of voltage operating flashing and switching means 10 to energize load 11 when charging current to battery 8 ceases. Sensing and filtering circuit 12 is connected at the output of flashing and switching means 10 in a series circuit configuration with load 11 to provide a resetting command signal 15 to timing means 4. Timing means 4 operates to close switch means 3 by means of a logic 1 signal output permitting the normal flow of charging current to battery 8. At the end of a timing period which may be one day or one week or any desired interval, timing means 4 "times out", changing its output from a logic 1 to a logic 10 which serves to open switch means 3, stopping the flow of charging current to battery 8, and through triggering means 14 activating flashing and switching means 10 causing load 11, shown here as an incandescent lamp, to alternately flash on and off. This opening of switch means 3 stimulates the kind of response of flashing and switching means 10 in conjunction with lamp 11 as would occur upon failure of AC power from the power mains. The failure indicating alarm circuit 2 is connected across the output of rectifying circuit 1 and upon removal of the load from this rectifying circuit, as occurs when switching means 3 opens, its output voltage measured between leads 77 and 78 rises sharply. Said rise in output voltage is sufficient to activate a flashing visual alarm indicator 26 and, if desired, an audible indicator 63 in parallel configuration therewith. Should the emergency flashing lamp load 11 operate properly, sensing and filtering circuit 12 will generate a resetting command signal 15 restoring the output of timing means 4 to a logic 1, closing switch means 3 thereby restoring normal charging current to battery 8. This application of a load to rectifying circuit 1 reduces its output voltage as measured between 77 and 78, disabling failure indicating alarm circuit 2. If for any reason no resetting signal 15 is obtained, for example, as would occur upon failure of battery 8, or non-continuity of load 11 or malfunction of flashing and switching means 10 or sensing and filtering circuit 12 or malfunction of rectifying circuit 1 (which would result in gradual depletion of voltage of battery 8) or such other circuit malfunction which inhibits obtaining of resetting signal 15, switch means 3 will not become closed since no resetting signal 15 had obtained and failure indicating alarm circuit 2 will continue to give its failure indication, drawing the attention of appropriate service personnel.

Since periodic self-testing may be scheduled by adjusting timing means 4 for some long interval, say, once per day or once per week, switch means 13 is provided to shorten the time cycle so that bench testing and servicing can be done in a reasonably short period of time.

Figure 2:
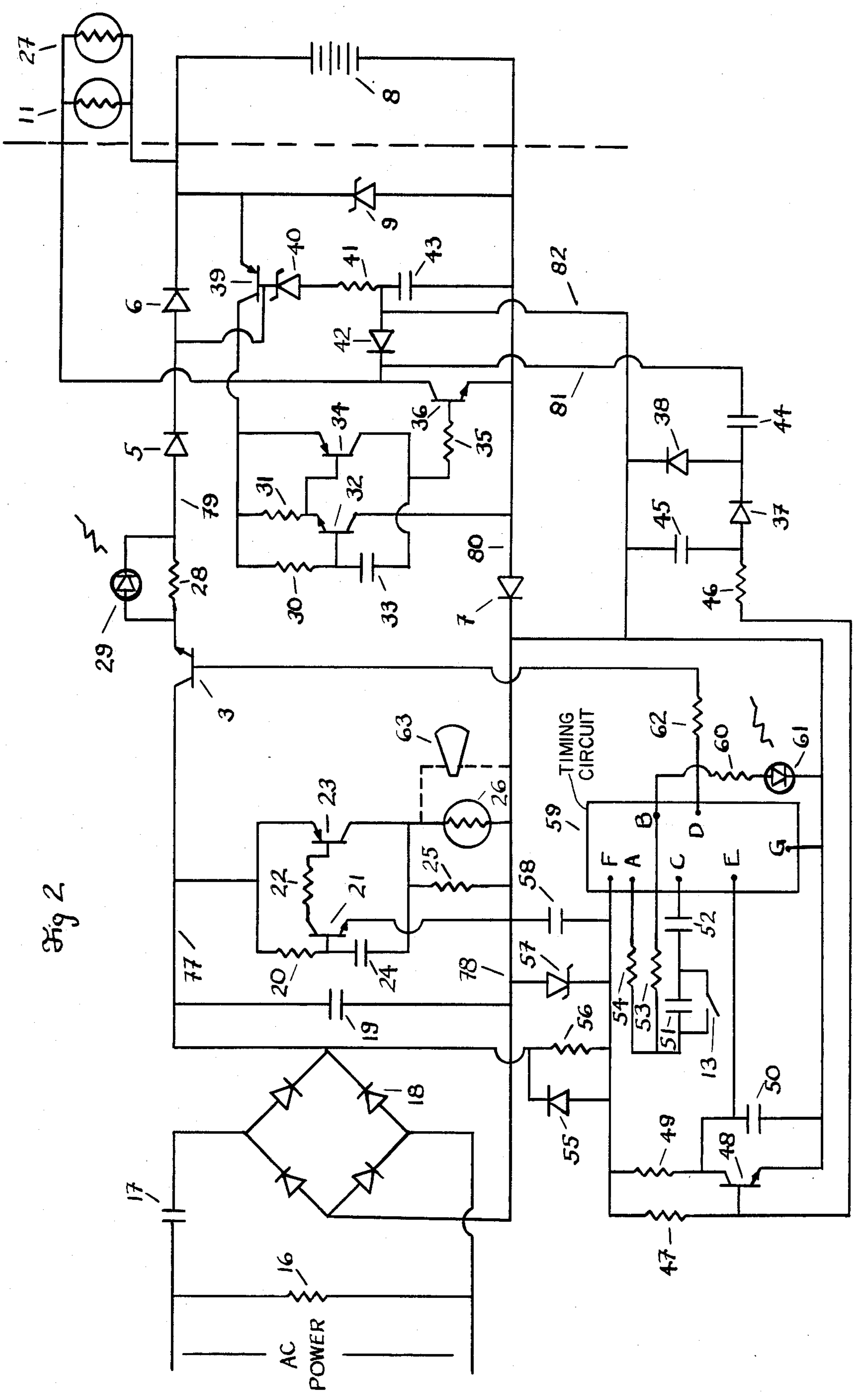
FIG. 2 is an overall detailed schematic of a circuit diagram of a circuit embodying the invention.

Referring to FIG. 2, an overall detailed schematic circuit diagram embodying the invention is shown. AC power is applied through a current limiting capacitor 17 to a bridge rectifier 18. Resistor 16 is connected in series configuration with capacitor 17 and bridge rectifier 18 and serves to discharge capacitor 17 when AC power is disconnected. The rectified DC output of rectifier 18 is filtered by capacitor 19 and applied to the failure indicating alarm circuit consisting of transistors 21 and 23 in circuit combination with resistors 20, 22, 25 and capacitor 24. At sufficiently high DC voltage across capacitor 19 the failure indicating alarm circuit operates to periodically trigger a flashing visual alarm indicator 26 and/or audible indicator 63. The rectified output current is also applied through transistor 3 when suitably biased, LED indicator 29 across a shunt resistor 28 and through blocking diodes 5, 6, 7 to the parallel combination of zener diode 9 and rechargeable battery 8 in a direction to charge battery 8. Base voltage of transistor 39 is maintained close to the voltage of its emitter by the current flowing through diode 6 which blocks current flow through transistor 39. When current through this diode ceases, such as would occur on failure of AC power or cutoff of transistor 3, current through transistor 39 will be caused to flow, momentarily energizing flashing circuit consisting of transistors 32, 34 and 36 with their associated resistors 30, 31, 35 and capacitor 33 to cause lamp 11 and, if desireable, parallel lamp 27 to flash intermittently, said flashing from the alternate conduction and cutoff of transistor 36 generating a pulsating DC voltage at the collector of transistor 36 which is coupled to filter capacitor 43 through blocking diode 42, thereby providing base current to transistor 39 through resistor 41 and zener diode 40. When continued flashing of lamps 11 and 27 have sufficiently depleted battery 8 the pulsating DC voltage across transistor 36 coupled to capacitor 43 through diode 42 will be insufficient to maintain appreciable base current in transistor 39 and said flashing circuit consisting of transistors 32, 34 and 36 with their associated circuit components will cease to flash. This then removes all base current from transistor 39 which cuts off current in transistor 36 thereby cutting off further current drain from battery 8.

Referring now to timing circuit 59 energized by the rectified output from rectifier 18 through zener arrangement consisting of 55 and 57, shunt resistor 56 across zener 55 and filter capacitor 58 is shown RC timing interval components consisting of resistors 53 and 54 and capacitors 51 and 52 with switch means 13 across capacitor 51 so that the timing interval is shortened when switch means 13 is open, effectively decreasing the circuit capacity by adding a capacitor in series with capacitor 52. LED indicator 61 is energized through resistor 60 to give visual blinking indication of timing rate. The output of timing circuit 59 applied through resistor 62 to the base of transistor 3 is normally a logic 1, serving to provide base current to transistor 3 and maintaining it in conduction and then switching to a logic 0 at the end of its timing interval, cutting off the base current of transistor 3 and thereby switching it to its open or non-conducting state. Said non-conduction of transistor 3 has an equivalent affect on flashing circuit consisting primarily of transistors 32, 34, 36, battery 8 and lamps 11 and 27 and their associated circuits as would occur upon failure of AC power from the power mains, namely, activating this circuit and causing lamps 11 and 27 to flash intermittently. As aforementioned, a pulsating DC voltage is generated at the collector of transistor 36 which voltage is coupled to rectifiers 37 and 38 through coupling capacitor 44 filtered by capacitor 45 and coupled as a negative voltage to the base of transistor 48 some short time interval after pulsating DC appears at the collector of transistor 36, said time interval being determined primarily by the value of filter components 44, 45, 46, 47 and the input resistance of the base circuit of transistor 48. This short time interval is incorporated to ensure that at least several pulsations of voltage across transistor 36 are required before reset of timing circuit 59 occurs. Said negative voltage serves to cut off transistor 48 providing a positive pulse at its collector which, when applied to timing circuit 59, resets its output to a logic 1 restoring normal current flow through transistor 3. It is apparent that where non-flashing operation of the emergency exit sign auxiliary lamp is desired, diode 38 may be eliminated and by replacing diode 37 by a short circuit and disabling flashing operation through elimination of capacitor 33 steady auxiliary lamp illumination is obtained while preserving all other exercising and self-testing features. Filter capacitor 50 is connected across the collector curcuit of transistor 48 to prevent spikes or other surges from false triggering and resetting of timing circuit 59 except from a proper reset signal derived from operation of lamp loads 11 and 27. Failure of such proper reset signal to appear as would be occasioned by the circuit malfunctions aforementioned would leave timing circuit 59 latched in its timed out condition, i.e., output a logic 0, cutting off transistor switch means 3 and, by virtue of removal of load from rectifying circuit 18, raising its output voltage sufficiently high to activate the failure indicating alarm circuit consisting of transistors 21 and 23 and their associated components providing visual and/or audible alarm indication through indicators 26 and 63 as aforementioned and thereby drawing attention to the existence of some malfunction of the emergency auxiliary lamp system.

Figure 3:
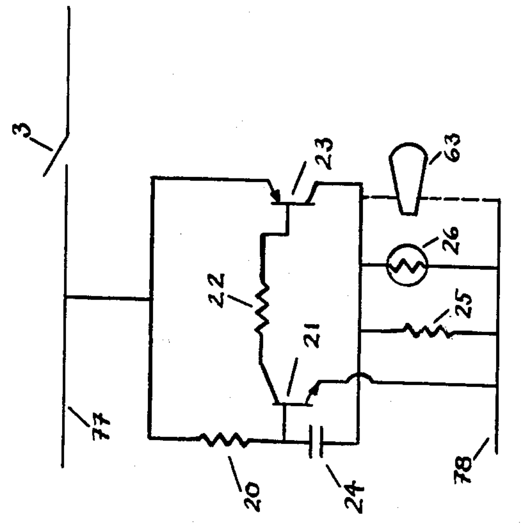
FIG. 3 is a detailed schematic circuit diagram of the alarm indicator giving either or both visual and audible alarm indication upon failure of the charger-flasher during periodic test.

In order to provide a failure alarm indication, circuit 2, described more fully in the detailed schematic circuit diagram FIG. 3, utilizes the sharp increase in voltage between leads 77 and 78 occasioned by the removal of load upon opening of switch means 3 during the periodic test interval to initate free running multivibrator action of transistors 21 and 23 with their associated circuit components consisting of resistors 20, 22 and 25, capacitor 24 and incandescent lamp load 26 and optional audible alarm 63 connected in parallel configuration with lamp 26. Detailed description of operation of this circuit will refer to FIG. 3.

Upon increase of voltage at 77 with respect to 78 when load is romoved on opening of switch means 3, shown here schematically, current through transistor 21 increases due to the increase of its base current bias. This causes a corresponding increase of bias current in transistor 23 through limiting resistor 22. The resulting collector current of transistor 23 flows through the parallel combination of resistors 25, lamp 26 and optional audible alarm 63, if used. I have discovered that when an incandescent lamp of low thermal inertia 26 is used, its positive temperature coefficient of resistance vs. current will result in a rapid increase in voltage at the collector of transistor 23 which, when coupled to the base of transistor 21 through capacitor 24, serves to regenerate and increase the current through 21 and 23 which quickly reach saturation. When capacitor 24 has charged sufficiently, current through 21 decreases rapidly cutting off current through 23 and thereby current through lamp 26, provided that the shunting effect of resistor 25 and audible alarm indicator 63, if incorporated, is not too great. This cutoff of current through resistor 23 extinguishes lamp 26 and the voltage across it drops close to zero. This voltage change is again coupled to the base of transistor 21 reinforcing cutoff of current through it. The cycle is repeated as 24 charges and discharges, so sustaining regenerative action at a rate determined primarily by the value of resistor 20, capacitor 24 and the thermal time constant of lamp 26, neglecting the minor shunting effects of 25 and 63 as aforementioned. By effectively including lamp 26 in the feedback configuration of the circuit its sharp resistance versus current characteristic is utilized to permit sustained regeneration only at voltages measured between 77 and 78 significantly higher than occur when the overall charger-flasher circuit shown in FIG. 2 operates normally and as do in fact occur when rectifier circuit 1 is unloaded through the opening of switch means 3 during periodic test.

Figure 4:
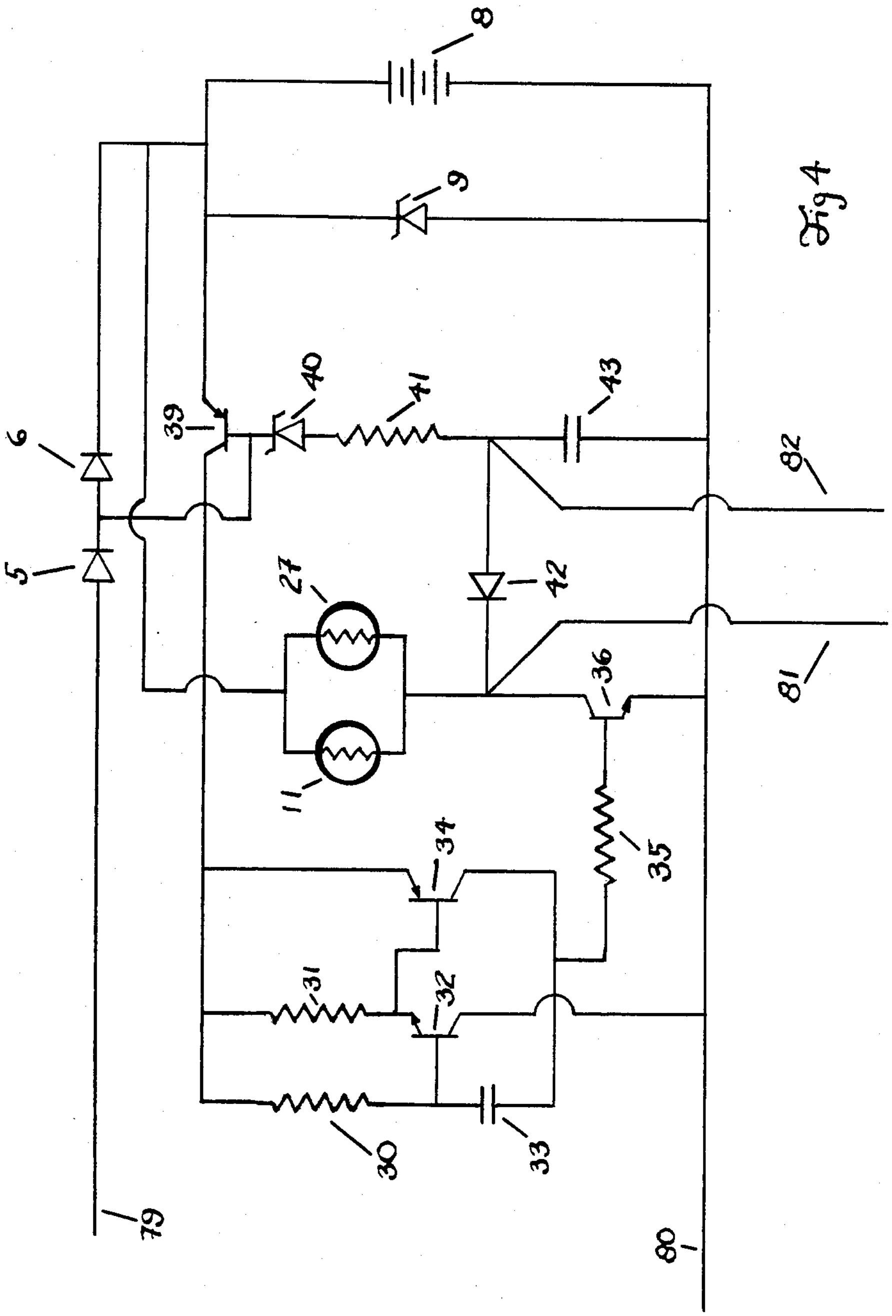
FIG. 4 is a detailed schematic circuit diagram of the emergency battery operated lamp flashing system and charger including provisions for preventing overcharging of the rechargeable battery and means to disconnect the battery from its load prior to excessive depletion which might result in diminished battery life.

Shown in FIG. 4 is the detailed schematic circuit diagram of the battery operated lamp flashing system and charger. DC voltage between leads 79 and 80 cause a charging current to flow through diodes 5, 6 into chargeable battery 8. Zener diode 9 is connected in parallel circuit configuration with battery 8 to prevent excessively high voltages between 79 and 80 from being applied to battery 8 through diodes 5, 6 with consequent damage to it. The charging current flowing through diodes 5 and 6 cause a low voltage to exist between base and emitter of transistor 39, effectively cutting off current flow through this transistor and maintaining the voltage on capacitor 43, that is at lead 82, close to the voltage of battery 8 less the base emitter voltage of transistor 39 less the voltage of zener diode 40. When charging current through diodes 5 and 6 and into battery 8 ceases, as occurs upon failure of the AC power mains voltage or during periodic self-test of the charger-flasher by the opening of switch means 3 simulating the effect of an AC power mains failure, voltage between base and emitter of transistor 39 is no longer held low by the current through diode 6 and transistor 39 begins to conduct current from battery 8. The base voltage of transistor 32 initially close to the potential of lead 80 allows emitter current to flow in transistor 32 as soon as current through transistor 39 is initiated. A corresponding increase of base current in transistor 34 causes the voltage at the collector of transistor 34 to rise, initiating current through transistor 36. This current flowing from battery 8 through lamp load consisting of 11 and 27 illuminates them and the resulting decrease in voltage at the collector of transistor 36 is coupled to capacitor 43 through blocking diode 42. This partially discharges capacitor 43 reducing the voltage at the base of transistor 39 as coupled through resistor 41 and zener diode 40 until transistor 39 is cut off. Cutoff of this current also cuts off the current through transistor 34 and consequently transistor 36, thereby extinguishing lamps 11 and 27. The voltage across capacitor 43 then rises again, initiating current through transistor 39 and the cycle repeats causing a flashing action of lamps 11 and 27 at a rate determined primarily by capacitors 33 and 43 with their associated resistive time constants. When continued flashing of the lamps 11 and 27 have sufficiently depleted battery 8 the pulsating current flowing through resistor 41 and zener diode 40 is insufficient to gate the current in transistor 39 alternately on and off until current through transistor 39 becomes substantially zero, stopping the regenerative action of the circuit and leaving transistor 36 in the cutoff state and so effectively removing all load from battery 8 whose voltage has now dropped to a significantly lower value than that of zener diode 9 so that an insignificantly small or effectively zero battery current flows through it or back biased diode 6. From this description it can be seen that a pulsating DC voltage appears between leads 81 and 82 only when the battery operated lamp flashing circuit is operative and this, when applied to the sensing and filtering circuit 12 of FIG. 1 comprising blocking capacitor 44, diode rectifiers 37 and 38 and filter elements 45, 46 and 47 of FIG. 2, produces a negative voltage at the gate of transistor 48 which generates a positive resetting command at the collector of transistor 48 to reset timing circuit 59, closing switch means 3, reinitiating charging current into battery 8 and simultaneously disabling the flashing of lamps 11 and 27 as well as the failure indicating alarm circuit 2. Should no pulsating DC voltage appear between leads 81 and 82 due to a malfunction indicative of one or more of the aforementioned possible failures, no resetting of timing means 59 will occur, leaving switch means 3 in the open state and failure indicating alarm circuit 2 in its flashing condition, calling attention to the malfunction in the battery operated flashing lamp system.

Figure 5:
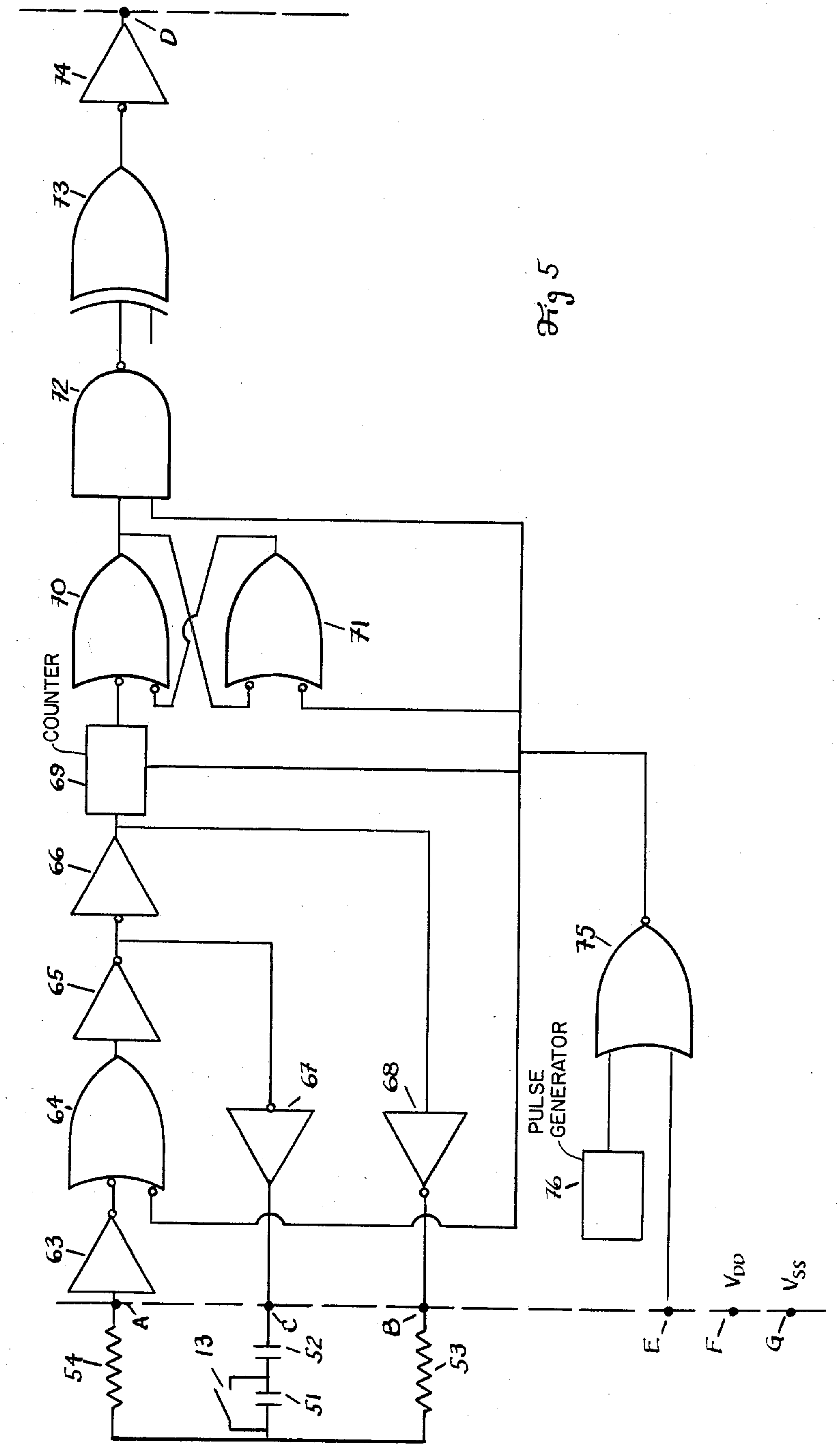
FIG. 5 is a logic diagram of the periodic timing circuit of the charger-flasher system.

The timing circuit 59 is described more fully in FIG. 5, a logic diagram of the periodic timing circuit of the charger-flasher system. Counting is initiated by application of a logic 1 to either input port of gate 75. This can be obtained as a reset signal applied to port E or at the initial application of power through operation of one shot pulse generator 76. The output of gate 75 then initiates gates 64, counter 69, latch 70, 71 and gate 72. An RC oscillator comprised of amplifier inverters 63, 65, 66, 67, 68 and gate 64 has its frequency determined by resistor 53 and capacitance 52 when switch 13 is in the closed condition or the equivalent series capacitance of capacitors 51 and 52 when switch 13 is open. Feedback applied to input port A through resistor 54 closes the loop and sustained oscillations result. The output of inverting amplifier 66 is applied to the input of counter 69 and at the end of its countdown causes switching and latching through operation of gates 70 and 71. This change of state is coupled to output port D through gates 72, 73 and 74. The second input of exclusive or gate 73 left unused is available for inversion purposes in another application of this circuit not applicable to this invention disclosure.

At time out the output at port D changes from a logic 1 to a logic 0 which opens switch means 3 as previously described and this output remains in this state through latching action of 70 and 71 until a reset signal is received at port E or through power initiation and operation of pulse generator 76. Also, it is clear that the length of time till time out can be altered by varying the number of binary counter stages in 69 or by varying the frequency determining components of the RC oscillator. This latter provides a simple means for altering the length of time to timeout under normal conditions of operation, say 24 hours, with switch 13 closed, to as short a time as five minutes or less with switch 13 open, as would be useful during test or troubleshooting of the overall system.

The self-testing cmergency exit sign auxiliary lamp flashing system may be provided on a printed circuit board in accordance with present day practice mounted within the emergency exit sign with the LED lamps 29 and 61 also being mounted on the board and, if desired, adjacent to apertures permitting them to be seen from outside the exit sign without need to disassemble the exit sign itself.

The above discussion of the emergency exit sign charging-flashing system including means for periodic exercising and self-testing for proper functioning has therefore demonstrated that the circuit of FIG. 2 operates in a reliable and secure manner to provide a visual and, if desired, audible alarm upon malfunction of any of the critical components of the system.

The foregoing discussion is merely illustrative of the principles of the present invention and there are many modifications, changes and adaptions thereof which will be readily apparent to those skilled in the art without departure from the spirit and scope of the present invention and while it has been described chiefly with reference to an emergency exit sign charger-flasher system, it is readily adaptable to other applications utilizing standby batteries which must be activated upon failure of power from the AC power mains and where it is desireable to periodically "exercise" and verify for proper operation of the standby system to ensure that it be properly functional when called upon to operate during an emergency.

What is claimed is:

1. An emergency exit sign auxiliary lamp illumination system operative in response to the failure of electrical power mains voltage, the improvement including:

(a) switch means to interrupt electrical power to a portion of said system and activating said switch means automatically at periodic intervals by included timing means;

(b) alarm means including visual and/or audible signal indications, said alarm means operative upon interruption of electrical power mains voltage to actuate said portion of said exit sign auxiliary lamp illumination system;

(c) detection means including filtering means for delaying response of said detection means, said detection means responsive to normal operation of said exit sign auxiliary lamp illumination system;

(d) means for automatically exercising and self-testing the proper functioning of said system to insure the system's being in a serviceable condition when called upon to function during power failure;

(e) circuit means utilizing a pulsating DC voltage to determine a sufficiently depleted battery so that current drain from the battery ceases and is not continued beyond a determined limit, the pulsating DC voltage sent across a transistor coupled to a capacitor, thence through a diode, the ceasing being with a DC voltage insufficient to maintain appreciable base current to an associated transistor, and (f) restoring means to restore power to said portion of said auxiliary lamp illumination system, said restoring means operative upon detection of normal auxiliary lamp operation by said detection means.

2. An emergency exit sign auxiliary lamp illumination system improvement in accordance with claim 1 wherein both said switch interrupting and restoring means consist of a solid state semiconductor.

3. An emergency exit sign auxiliary lamp illumination system improvement in accordance with claim 1 wherein said visual indicator includes an incandescent lamp with filament of low thermal inertia.

4. An emergency exit sign auxiliary lamp illumination system improvement in accordance with claim 1 wherein there is provided in said circuit means a timing means to establish a rate and cause the visual indication to blink at said timing rate.

5. An emergency exit sign auxiliary lamp illumination system improvement in accordance with claim 4 wherein the blinking indication is provided by an LED indictor energized through a resistor to cause blinking at said timing rate.

* * * * *